(No Model.) C. E. KNUDSON. 6 Sheets—Sheet 3.
CORN HARVESTER.

No. 594,802. Patented Nov. 30, 1897.

Witnesses
John W. Gardner

Inventor
Chas. E. Knudson
by A. J. Gardner
Attorney (No Model.) 6 Sheets—Sheet 4.
C. E. KNUDSON.
CORN HARVESTER.
No. 594,802. Patented Nov. 30, 1897.
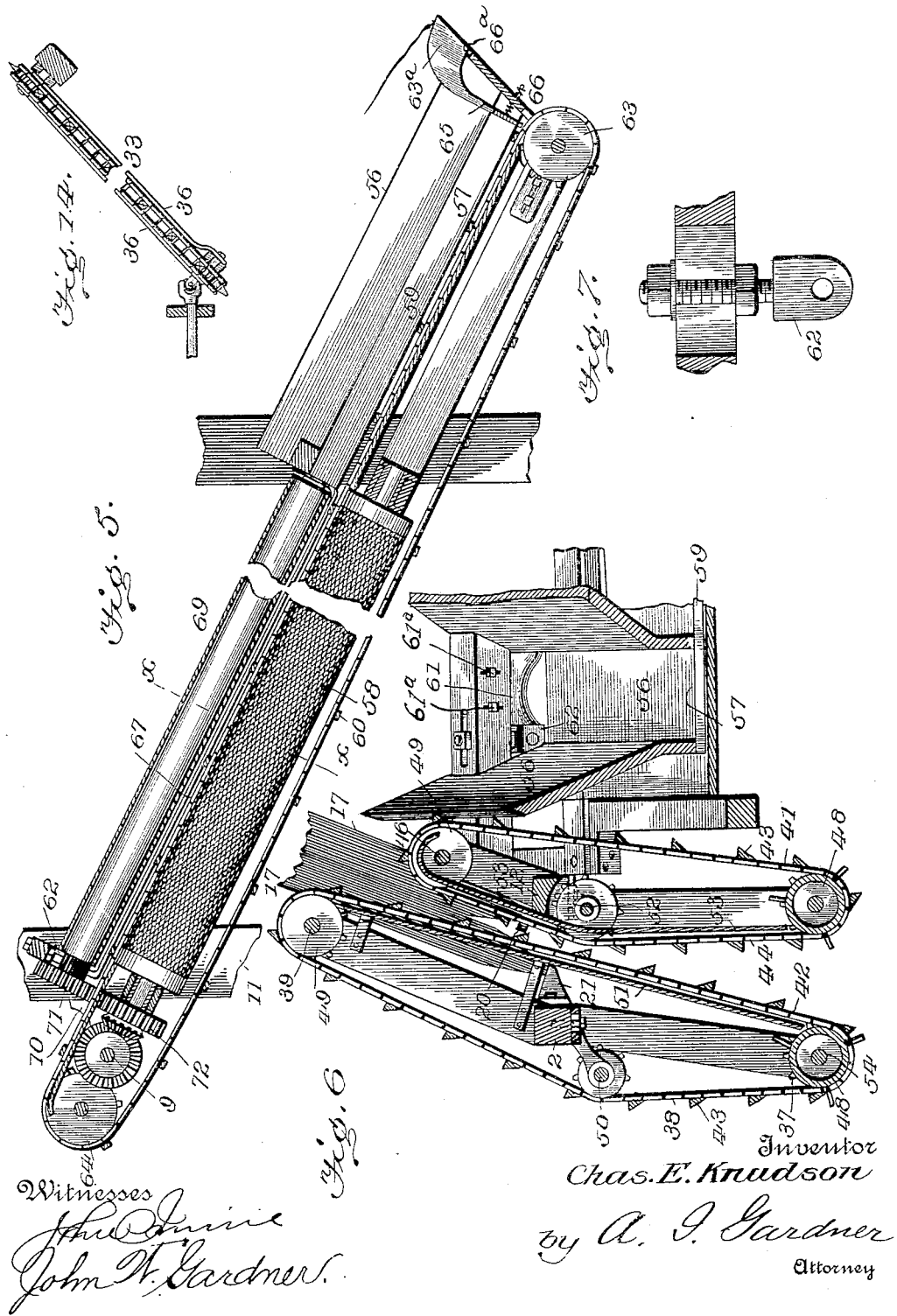
Witnesses
John W. Gardner
Inventor
Chas. E. Knudson
by A. I. Gardner
Attorney (No Model.) 6 Sheets—Sheet 5.
C. E. KNUDSON.
CORN HARVESTER.
No. 594,802. Patented Nov. 30, 1897.
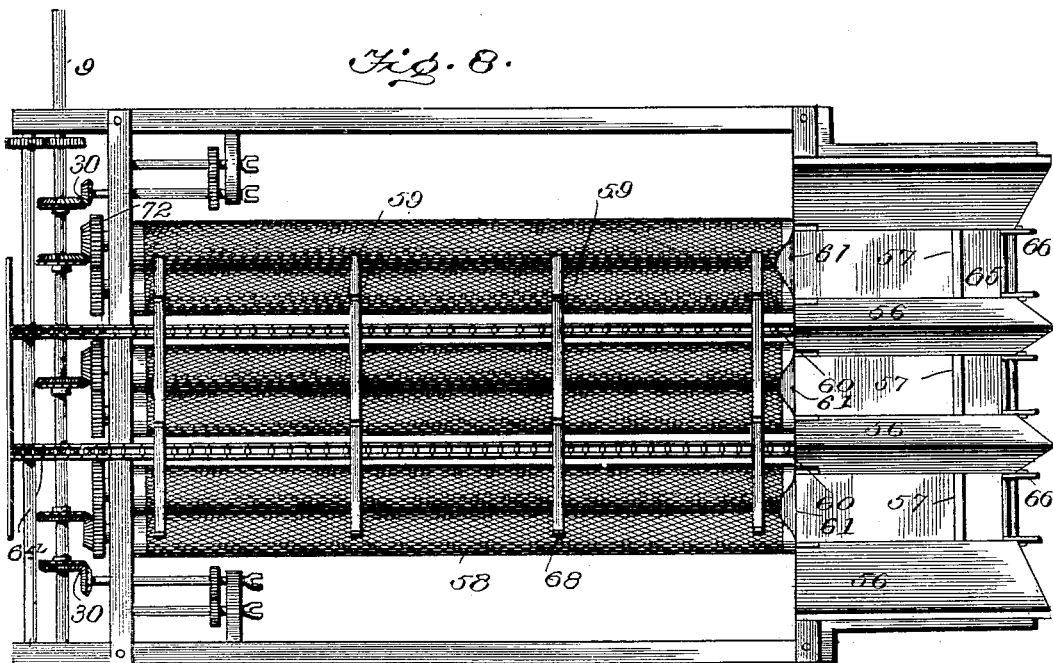
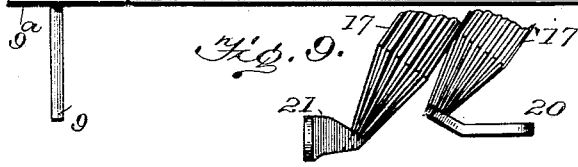
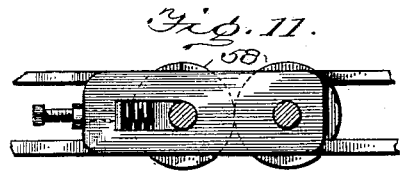
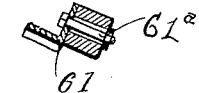
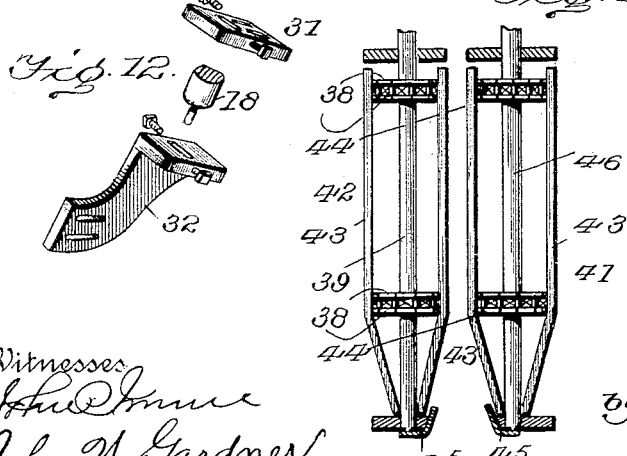
Witnesses
John Innue
John W. Gardner
Inventor
Chas. E. Knudson
by A. I. Gardner
Attorney

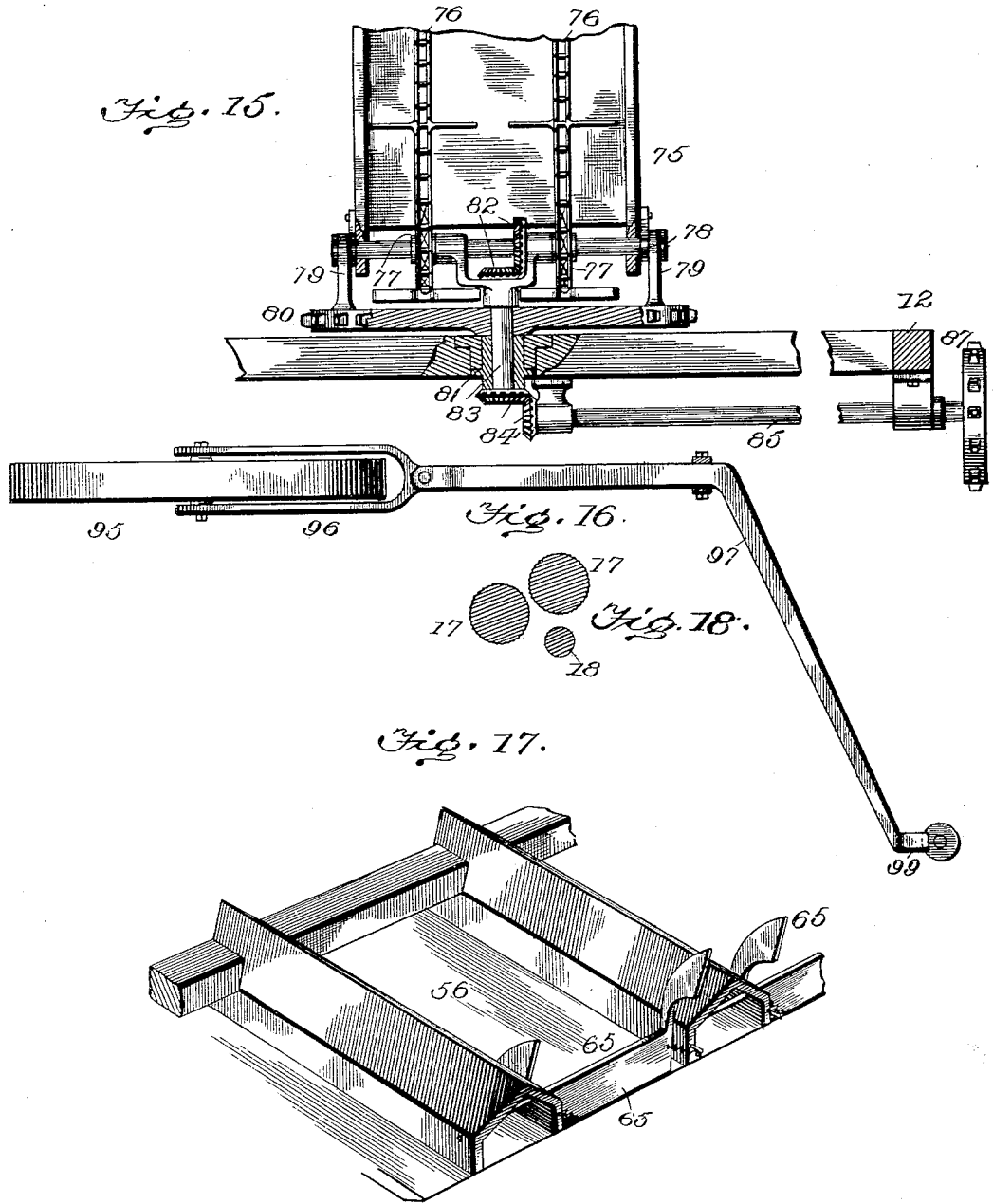

UNITED STATES PATENT OFFICE.

CHARLES EDWIN KNUDSON, OF EVEREST, KANSAS.

CORN-HARVESTER.

SPECIFICATION forming part of Letters Patent No. 594,802, dated November 30, 1897.

Application filed February 16, 1897. Serial No. 623,718. (No model.)

*To all whom it may concern:*

Be it known that I, CHARLES EDWIN KNUDSON, a citizen of the United States, and a resident of Everest, in the county of Brown and State of Kansas, have invented certain new and useful Improvements in Corn-Harvesting Machines, of which the following is a specification.

My invention relates to that class of corn-harvesters known as "roller strippers."

The objects of my invention are, first, to provide a corn-harvester which will strip the ears from the standing corn without unduly injuring the stalk, and which will, in addition, gather up any down or loose corn and harvest the ears therefrom; second, to provide an improved form of stripper which will strip the ear from the stalk with a minimum of friction, thus materially reducing the power necessary to draw the machine and without unnecessary and wasteful shelling of the corn from the ear, as in other strippers; third, to provide an improved husking mechanism arranged with a device for guiding and manipulating the ears upon the husking-rollers, keeping the ear always lying in a longitudinal direction and tending to assist the husking-rollers to rotate it and thus loosen the husk and facilitate its removal from the ear. I also provide an improved discharging-conveyer, which is capable of being adjusted in any position and controlled at the will of the operator.

Further objects and advantages will appear in the following description and be particularly pointed out in the claims.

Figure 1:
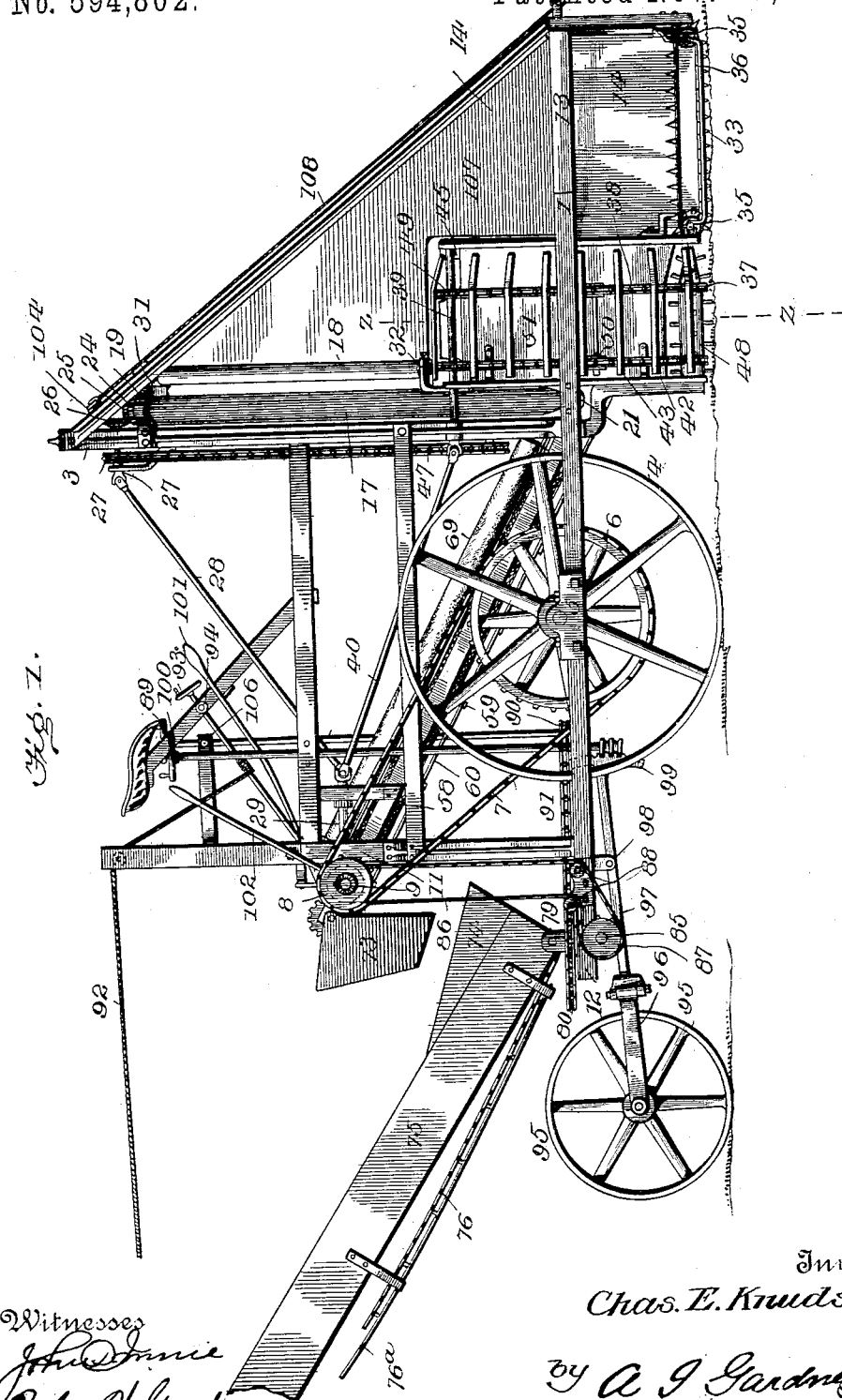
Figure 2:
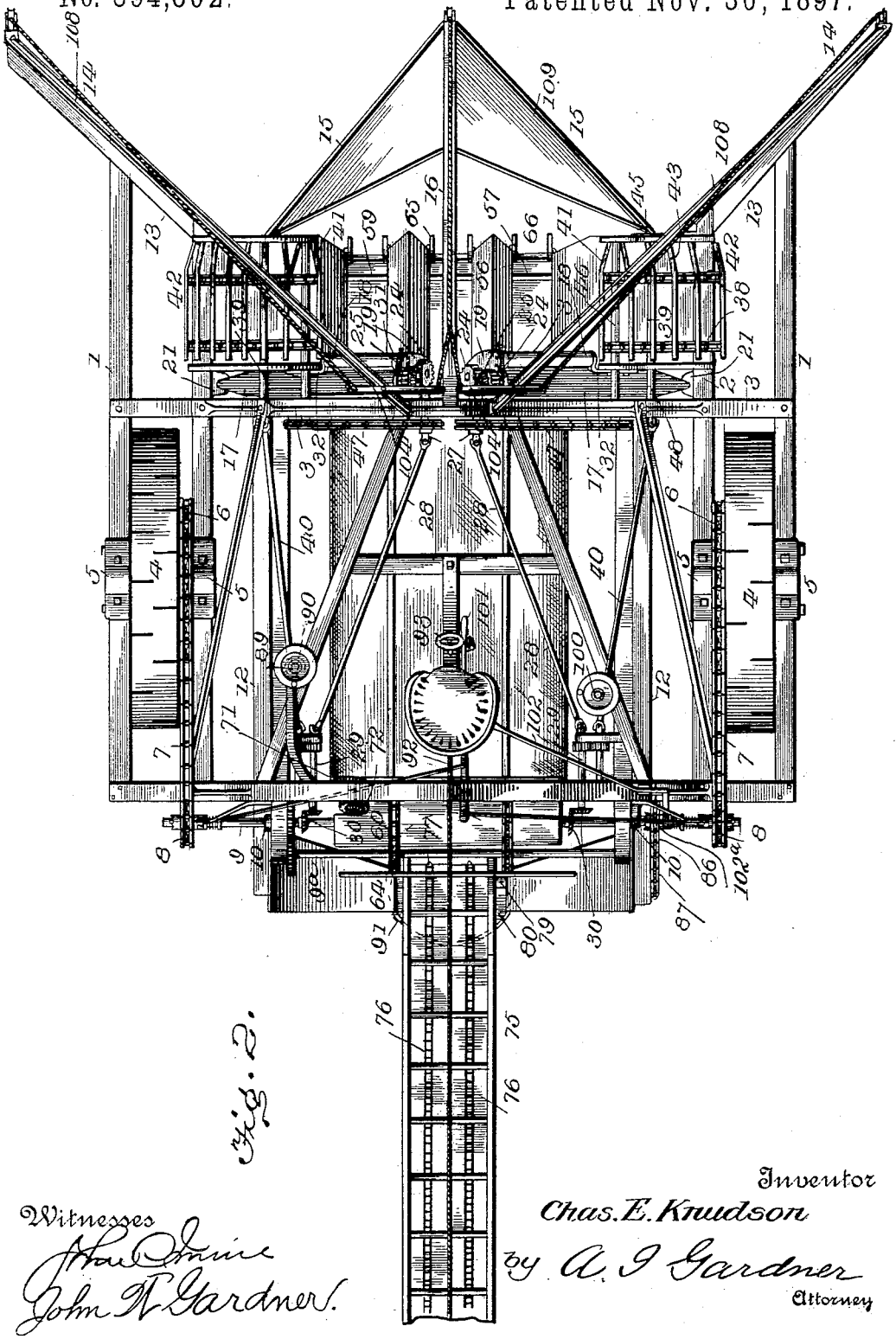
Figure 3:
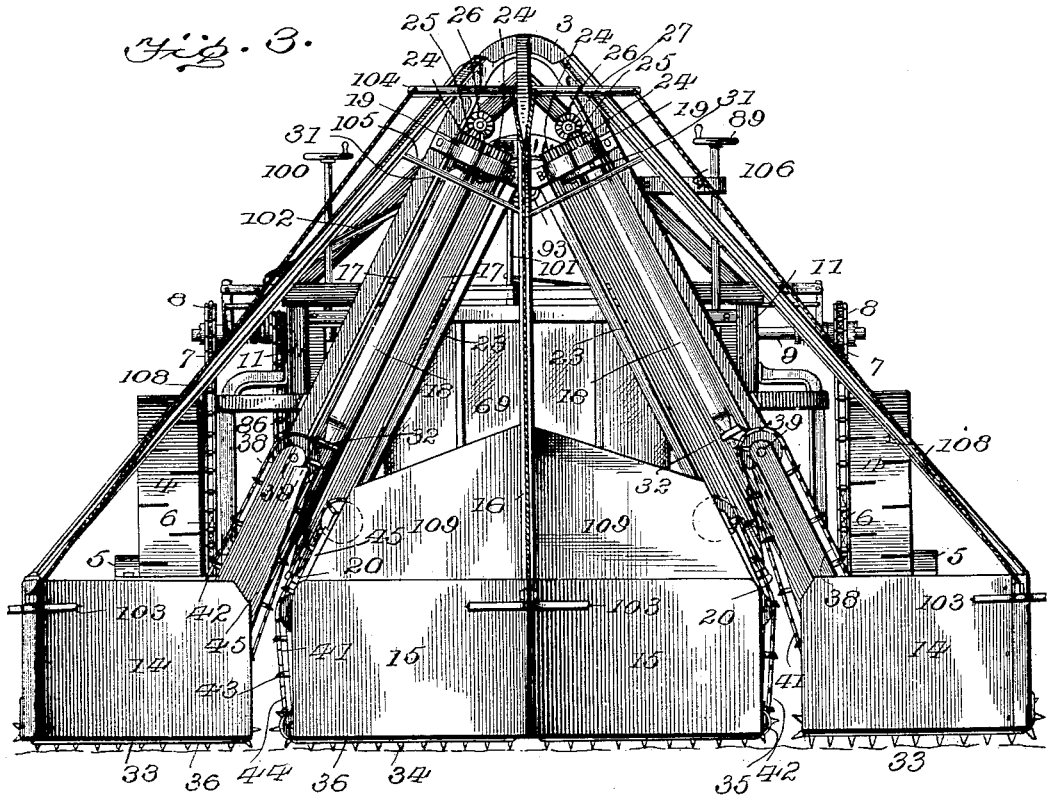
Figure 4:
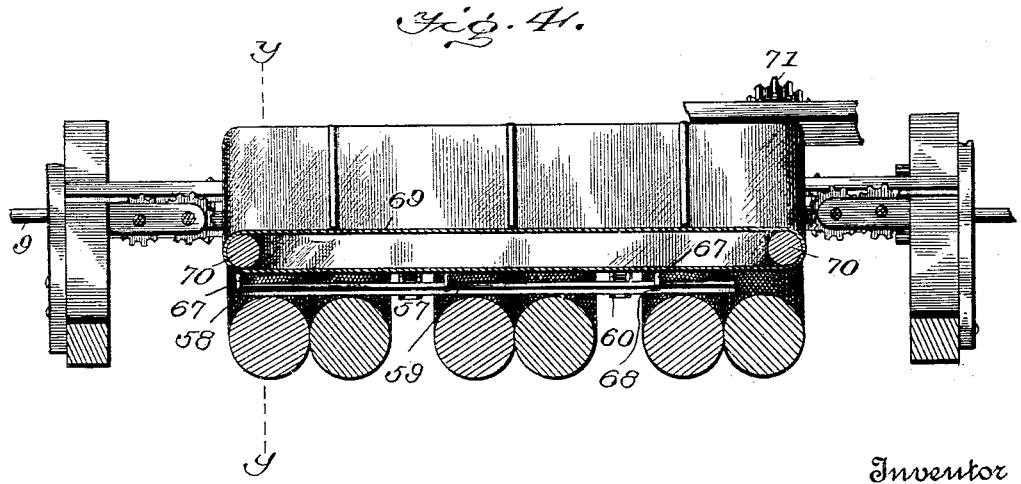

In the accompanying drawings, illustrating my invention, Figure 1 is a side elevation of the complete machine. Fig. 2 is a plan view of the same. Fig. 3 is a front elevation with the side shields removed. Fig. 4 is a vertical transverse section of the husking mechanism, taken on the line $x\,x$ of Fig. 5. Fig. 5 is a longitudinal vertical section of the husking mechanism, taken on the line $y\,y$ of Fig. 4. Fig. 6 is a detached transverse vertical section of the endless carrier, taken on the line $z\,z$ of Fig. 1. Fig. 7 is a detail view of the adjustable bearing for the operating-rollers of the endless canvas band. Fig. 8 is a plan view of the husking-rollers and their conveyer. Fig. 9 is a detail view of the lower end of the stripper-rollers. Fig. 10 is a detail view of the lower adjustable bracket-bearing of the inside stripper-roller. Fig. 11 is a detail end view of the husking-rollers, showing the spring adjustment of the bearing of one roller of each pair. Fig. 12 shows the upper and lower adjustable bracket-bearings for the auxiliary stripper-roller. Fig. 13 is a detail diagram of the endless carrier. Fig. 14 is a bottom view of the endless gathering-chain. Fig. 15 is a vertical transverse section of the rotating mechanism of the discharging-conveyer. Fig. 16 is a top view of the rear wheel and supporting-frame. Fig. 17 is a perspective view of the lower end of the husking-conveyer, showing the receiver for the ears as they are stripped from the stalks and also the agitators. Fig. 18 is a sectional view showing the relative positions of each of the three stripper-rollers that compose a set. Fig. 19 is a detail view of one of the guards between the hoppers and the husking-rolls, showing the bolts $61^a$, whereby the guard is adjustably attached to the frame of the machine.

Like numerals of reference designate like parts throughout all the views.

The main frame of the machine consists of the horizontal side pieces 1 and 2. To these are secured the transverse vertical main yoke 3.

Centrally located on each side of the machine upon the longitudinal pieces 1 and 2 are the journals 5 for the main supporting-wheels 4. On the inner side of each main supporting-wheel and rigidly secured to the axle of same is the main driving-sprocket 6, which, by means of the bull-chain 7 and the sprocket-wheel 8, transmits motion to the main shaft 9. This main shaft 9 is journaled in brackets 10 10, which are bolted to the vertical beams 11. Said beams 11 form a part of the main frame of the machine, their bases being securely fastened to the ends of the longitudinal side pieces 12 of the frame.

At the forward ends of the longitudinal pieces 1 and 2 are secured the beams 13 13, which are set at an angle with said longitudinal beams and form a support for the guide-plates 14. In the same manner the outer ends of the guide-plates 15 are secured to the front of the machine by means of the brace-bar 16, that extends from the top of the yoke 3, the inner ends of the said guide-plates 15 being secured to the front end of the longitudinal side pieces 12.

The main stripper-rollers 17 17 are arranged in an inclined position, parallel to the sides of the yoke 3, and are suitably journaled at the top in the bracket 19, which bracket also serves as a brace for the sides of the yoke. At the lower ends the rollers are journaled in brackets 20 and 21, the bracket 21 of the outer roller being secured to the longitudinal side pieces 2 and the bracket for the inner roller being secured to the longitudinal side piece 12 of the main frame. The journal-bracket 20 is provided with longitudinal slots 22 for adjusting the inner stripper-roller in proper relation to the outer stripper-roller, depending upon the size of the ears to be harvested.

23 are brace-bars connected at their upper ends to the bracket-bearing 19 and at their lower ends to the end of the longitudinal side bars 12. The upper ends of the shafts of the stripper-rollers 17 are provided with intermeshing spur-gears 24, which are located above the bracket 19. Above the spur-gear on the outer stripper-roller and concentric therewith is located a bevel-gear 25, which is driven by a corresponding bevel-gear 26, which gear is located at the end of a shaft 27, said shaft being journaled to a bracket attached to the upper portion of the yoke 3. The shaft 27 is driven through the medium of a rod 28, provided at each end with a universal joint, said rod being connected at its rear end to a shaft 29, which is driven by a bevel-gear 30 on the main operating-shaft 9.

18 is my auxiliary stripper-roller, which is adjustably journaled at its upper end in the bracket 31, which is securely fastened to the under side of the bracket 19 and at its lower end is adjustably journaled in the adjustable bracket 32, which bracket is secured to the inner side of the yoke 3. This auxiliary roller 18 is interposed in the path of the ear as it is drawn toward the stripper-rollers 17, the object of the roller 18 being to deflect the ear from its natural course and to break it from the stalk instead of forcibly pinching the ear from the stalk, as is customary in other machines of this class with which I am familiar.

33 and 34 are endless gathering-chains provided with vertically-projecting fingers, located adjacent to the lower edge of the guide-plates 14 and 15. These gathering-chains are supported upon sprocket-wheels 35, which sprocket-wheels are suitably supported in bearings attached to the frame of the machine, the front sprocket-wheel being vertically adjustable in its bracket, so as to regulate the angle of the action of the chain according to the slope of the ground away from the rows of corn. The rear sprocket is driven by a sprocket-wheel 37 through the medium of a universal joint. (See Fig. 14.) This sprocket-wheel 37 is driven by a chain 38, which is carried over a sprocket-wheel on the shaft 39, said shaft being driven through the medium of the rod 40, which is connected by intermediate gearing to the main driving-shaft 9.

36 are guard-plates located on each side of the gathering-chain 35. The object of the chain 35 is to draw in the down and loose corn and convey it between the endless carriers 41 and 42. The object of the guards 36 is to hold the chain in position and prevent its injury or displacement by coming in contact with obstructions.

41 and 42 are endless carriers for elevating the corn to the stripper-rollers. These carriers consist of a multiple of cross-bars 43, supported on the endless chains 38 44. The portions of the cross-bars which lie between the chains are parallel to the shaft of the sprocket-wheels over which the chains are carried. The outer ends of these bars are bent inwardly, as illustrated in Fig. 13, the object of this peculiar shape of the cross-bar being to prevent the corn from becoming entangled with the chain and to guide the corn and facilitate its entrance into the proper position between the two inner sides of the carriers.

45 are shields which project inwardly and overlap the forward ends of the cross-bars 43. These shields 45 extend from the bearing of the lower gathering-cylinder 48 upwardly to the bearing of the upper sprocket-wheel 49 of the conveyer. The upper shaft 46 of the inner carrier is rotated by a chain 47, which is driven by a sprocket on the shaft 27, and the upper shaft 39 of the outer carrier is driven by means of the rod 40, which is connected to the main driving-shaft 9 by intermediate gearing. The tension of the carrier 42 is regulated by the sprocket-wheel 50, which is adjustably supported upon the frame 2.

51 is a back plate which extends from the lower gathering-cylinder 48 to the upper sprocket-wheel 49 of the outer carrier, and which is located adjacent to the inner side of the carrier 42 and is adapted to prevent the carrier from being forced inwardly by the corn as it is carried up thereby and to act as a shield to prevent the corn from entering between the cross-bars of the carrier and becoming entangled therewith. The inner carrier 41 travels over a sprocket-wheel 52, which is adjustably supported upon the frame of the machine and is adapted to regulate the tension of the carrier and its relative position to the carrier 42.

53 is a back plate similar to the back plate 51, extending from the lower gathering-cylinder 48 to the upper sprocket-wheel 49. The working faces of the cross-bars 43 are so inclined to the surface of the carrier that any heavy material which the carrier is not designed to raise will be rejected and not carried upward to the stripper-rollers, and so that the upward tension on standing stalks will not be sufficient to tear them up from the ground. The action of the gathering-chain 36 is supplemented by the action of the gathering-cylinder 48, which is provided over its surface with projecting teeth.

105 are bar-fenders to prevent the tops of the stalks from coming in contact with the upper gearing of the stripper-rollers. A shield 107 is also provided, which extends from the upper edge of the guide-plate 14 upwardly to the bar-fender 105 and laterally to the brace-bar 108. A smaller shield 109 also extends from the upper edge of the guide-plate 15 upwardly and sloping backward to the front side 66 of the hoppers. These shields are adapted to guide the standing stalks between the stripper-rollers.

It will be seen from the drawings that the carriers and stripper-rollers above described are arranged in duplicate, one set on each side of the machine, so that two rows of corn may be harvested simultaneously. After the ear is removed from the stalk it falls into a hopper 56. In the bottom of this hopper is located the endless conveyer 57, which carries the ears from the hopper to the husking-rolls 58. This conveyer consists of cross-bars 59, carried by the endless chains 60, which run over the sprocket-wheels 63 and 64, the sprocket-wheel 64 being secured to the shaft 9ª, which is driven from the main shaft by means of intermeshing spur-gears.

61 are guards made, preferably, of sheet metal and bent into the form of an arch and rigidly attached to bolts 61ª, which are vertically adjustable in slots in the frame of the machine. (See Figs. 6 and 19.)

65 are agitators, which consist of plates pivotally supported, said plates depending into the path of the cross-bars 59, so that as each cross-bar comes in contact with this plate the same will be oscillated, thus pushing forward and assisting the ears into proper position upon the conveyer. The front side of the hopper 56 is provided with slots 66ª in alinement with the upper ends of the agitators and adapted to receive the ends as they are oscillated, so as to prevent the ears from entering between the agitator and the front side of the hopper and thereby blocking the same.

The husking-rollers 58 consist of cylinders, preferably of metal, and with milled or corrugated surfaces, said rolls being provided with smooth rims at their ends, so as to prevent the milled surfaces from excessive rubbing against each other and unduly wearing the same. These husking-rollers are arranged in an inclined position, sloping downwardly toward the front of the machine, and are driven through the medium of bevel-gears located on the main driving-shaft. These rollers are arranged in three pairs, each pair being arranged adjacent to one of the hoppers 56.

Three sets of huskers and hoppers are used instead of two, so that the huskers may be run at a moderate speed without choking the hoppers. I do not wish, however, to limit myself to three sets, as an addition to that number may be found desirable and could easily be arranged within the scope of my invention. The hoppers are constructed somewhat longer than the length of an ear and with sloping sides, the width at the bottom being about equal to the diameter of an ear, so that as each ear settles to the bottom of the hopper it will fall in proper alinement.

67 are rods arranged parallel with the husking-rollers and rigidly secured at each end to the frame of the machine. The cross-bars 59 are provided with transverse grooves 68, adapted to receive the rods 67, so that the rods may lie in close proximity to the husking-rollers and as a stop to the transverse motion of the ears in case the ear should tend to pass beyond its natural position between each pair of husking-rollers and to keep the ears in alinement with the rollers.

Above the husking rollers and conveyer is located the endless band, of canvas or similar material 69, which is carried by the rolls 70, said rolls lying parallel to the husking-rollers and journaled at their ends in adjustable boxes 62, (see Fig. 7,) which are attached to the main frame, and said rollers are driven by gears 71, which intermesh with the gears 72 of the husking-rollers. This band passes transversely over the ears as they are carried up by the conveyer over the husking-rollers. The main function of this canvas band is to rotate the ears, so as to assist the husking-rollers to remove the husk and silk, and a further important function is to keep the ear in alinement with the rollers and prevent the ears from assuming a position perpendicular to the plane of the rollers and tending to enter endwise between the same and thus cause undue friction and mutilation of the ear.

With the use of the pressure-belt it has not been found necessary to provide any projecting teeth upon the husking-rollers, as in many other machines that are not provided with my improvement. The great objection to the long teeth upon the husking-rollers is that they tend not only to strip the husks from the ear, but also often shell a large portion of the corn from the ear, which passes through and is lost. When the ear has reached the upper extremity of the husking-conveyer, it is then discharged into the hopper 73, which guides the corn into the receiving-hood 74 of the discharging-elevator 75. The discharging-elevator consists of the endless conveyers 76, carried by sprocket-wheels 77, journaled at each end of the elevator. The endless conveyers 76 are provided beneath with guards 76ª, which are secured to the elevator-box. The elevator is pivotally supported upon the standards 79, which are integral with the large sprocket-wheel 80, which forms the base of the elevator and is rotatably journaled in the bushing 81. The driving-sprockets 77 are keyed to the shaft 78, which is driven by means of the intermeshing bevel-gears 82, the shaft 83, the bevel-gears 84, and shaft 85.

The shaft 85 is driven from the main shaft 9 by means of the chain 86 and sprocket-wheel 87. The intermediate pulleys 88 are journaled to the main frame of the machine upon an adjustable bracket and serve to pass the driving-chain 86 in a direction that will not be in interference with the elevator when it is in cross position, and these pulleys are also adapted to regulate the tension upon the chain. The elevator is turned laterally upon its pivot by means of the rod and hand-wheel 89, which transmit motion to the sprocket-wheel 80 by means of the sprocket-wheel 90 and chain 91, the rod 89 being supported at its upper extremity in a bracket extending out from the main frame, the bearing in said bracket being provided with a set-screw 106, whereby the rod may be held in a fixed position or released at the will of the operator.

The discharging end of the elevator is lowered or raised by means of the rope or chain 92, which is fastened to the discharging end of the elevator at one end and to the rod and hand-wheel 93 at the other end, and the elevator is secured in any desired position by means of the set-screw 94, which is provided with a hand-wheel for tightening and loosening the same.

The rear-wheel 95 (see Fig. 16) is carried by its frame 96, which is pivotally secured to the end of the bent lever 97, which is pivoted in the bracket 98, said bracket being centrally attached to the under side of the rear cross-bar of the main frame. The lever 97 is provided at its inner end with a segmental worm-gear 99, which is driven by means of the worm on lower end of the rod and hand-wheel 100. The object of this mechanism is to perform the vertical adjustment of the front end of the machine. The sprocket-wheels 8 are loosely mounted upon the main driving-shaft 9, said sprocket-wheels being provided with clutching mechanism, whereby they may be drawn in or out of engagement with the main driving-shaft. These clutches are operated by means of the double-acting lever 101, which is pivoted to the main frame, and the outer end of the lever is adjustably secured in a notched bracket which is secured to the seat-post.

A clutching mechanism 102$^a$ is also provided for the elevator-conveyers, whereby the conveyer may be thrown in or out of gear with the main driving-shaft, said clutch being controlled by the lever 102.

The singletrees 103 are attached to ropes or chains, which pass through pulleys attached to the front extremities of the brace-bars 16 and extend to the top of the machine, where they are connected to equalizers 104, which are pivoted to the front portion of the main yoke of the frame.

Having thus described the mechanism of my invention, the operation thereof is as follows: The harvester is drawn by three horses and takes the two rows of corn between the three horses. The draft of the machine is equalized between the three horses by means of the equalizing device. The standing corn is guided into the channel between the stripper-rollers by means of the guide-plates and shields. The down and loose corn is raked or drawn toward the gathering-cylinders and is then picked up by said cylinders and elevated by the endless carrier. Inasmuch as the top of the inner carrier is lower than the top of the outer carrier, the loose ears are carried over into the adjoining hopper and do not pass into the stripper-rollers. The standing stalks, together with the down stalks, are fed between the stripper-rollers and the ears are stripped from the stalks and fall into the hoppers. The stalks pass on and out through the open channel of the harvester as it is drawn forward. The conveyer carries the ears up beneath the guard and over the husking-rollers. The guard is so adjusted that it will allow but one ear to pass from each hopper with each cross-bar of the conveyer, and the guard acts further to prevent the ears from entering above or between the canvas. As the ear passes up over the husking-rollers it is rotated and pressed against the rollers and held in proper alinement by means of the canvas pressure-belt, which passes transversely across the upper sides of the ears. The ears are further prevented from passing out of proper position by means of the stop-bars, which lie between the under surface of the canvas and the cross-bars of the conveyer, the transverse grooves being provided in the cross-bars of the conveyer, as heretofore stated, so that the stop-bars may lie in close proximity to the husking-rollers. These bars also assist in holding the conveyer in position. As the corn passes over the husking-rollers the husks and silks are removed and drop through to the ground. The husked ears now pass up and are discharged through the hopper into the elevator-hood. It is then carried up by the elevator-conveyer and discharged into a wagon attached to the rear of the harvester, or, when more convenient, the elevator is swung either to the right or left, and the ears are then discharged into a wagon which is drawn at the side of the harvester. The rear wheel of the machine runs between the two rows that are being harvested and serves as a third support for the machine and as a means for the vertical adjustment of the forward end thereof, so that the gathering chains and cylinders may be raised or lowered to correspond to the varying surface of the ground. This adjustment is effected, as has already been described, at the will of the operator by means of a hand-wheel. The two main supporting-wheels are centrally located, so as to carry the main weight of the machine, and run outside of the rows being harvested, thus forming a broad support for the machine and rendering it perfectly stable even on steep hillsides.

I do not desire to limit myself to the precise details of construction herein shown and described, but reserve the right to alter the same within the knowledge of the skilled mechanic without departing from the spirit of my invention or sacrificing any of the advantages thereof.

Having described my invention, what I claim as new, and desire to secure by Letters Patent, is—

1. In a corn-harvesting machine, a main frame, consisting of the combination of two outer side frames provided with main supporting-wheels, said side frames being provided at their forward ends with vertical diverging guide-plates, a main V-shaped yoke projecting vertically upward rigidly connecting said outer frames, and an inner frame rigidly supported from the upper portion of said yoke, said inner frame being provided at its forward portion with vertical converging guide-plates meeting at their forward edges, said guide-plates being adapted to guide the corn into the channels between said frames, substantially as described.

2. In a corn-harvesting machine, a main frame consisting of the combination of two outer side frames, a main yoke projecting upwardly rigidly connecting said outer frames, an inner frame rigidly supported from the upper portion of said yoke forming channels between the outer frames and the inner frame, stripper-rollers located on each side of said channels, each pair being inclined toward the other, and hoppers at the forward end of said inner frame, beneath said stripper-rollers, and extending substantially the entire width of said inner frame, whereby the ears may fall directly into the hoppers, as and for the purpose set forth.

3. In a corn-harvesting machine, a main frame consisting of the combination of two outer side frames, a main yoke projecting upwardly rigidly connecting said outer frames, an inner frame rigidly supported from the upper portion of said yoke forming channels between the outer frames and the inner frame, stripper-rollers located on each side of said channels, each pair being inclined toward the other and arranged in a vertical plane, and hoppers at the forward end of said inner frame, beneath said stripper-rollers, and extending substantially the entire width of said inner frame, whereby the ears may fall directly into the hoppers, substantially as described.

4. In a corn-harvesting machine, a main frame consisting of the combination of two outer side frames, a main V-shaped yoke projecting vertically upward rigidly connecting said outer frames, an inner frame rigidly supported from the upper portion of said yoke forming channels between the outer frames and the inner frame, stripper-rollers located on each side of said channels, each set of said rollers being arranged substantially parallel to the leg of the yoke adjacent thereto, and hoppers at the forward end of said inner frame beneath said stripper-rollers, and extending substantially the entire width of said inner frame, whereby the ears may fall directly into the hoppers, substantially as described.

5. In a corn-harvesting machine, the combination of a main frame consisting of two outer side frames, a main yoke projecting upwardly connecting said outer frames, an inner frame rigidly supported from the upper portion of said yoke, forming channels between the outer frames and the inner frame, stripper-rollers located on each side of said channels, each pair being inclined toward the other, hoppers at the forward end of said inner frame beneath said stripper-rollers and extending substantially the entire width of said inner frame, husking-rollers arranged longitudinally of the machine and upon said inner frame directly back of said hoppers, and means for conducting the ears from the hoppers to the husking-rollers, substantially as described.

6. In a corn-harvesting machine, the combination of the guide-plates extending forwardly and divergently and adapted to conduct the stalks to the operative parts of the machine, a pair of vertically-arranged sprocket-wheels suitably journaled adjacent to the rear face of each guide-plate near the lower edge thereof, endless gathering-chains provided with vertically-projecting fingers carried by each pair of sprockets, the under portions of said chains being driven in proximity to the ground and substantially parallel thereto, the direction of motion of said under portions being from the forward sprocket toward the rear sprocket, so as to conduct the fallen stalks and ears to the operative parts of the machine, substantially as described.

7. In a corn-harvesting machine provided with stripper-rollers, the combination of the guide-plates extending forwardly and divergently and adapted to conduct the standing stalks to the stripper-rollers, said guide-plates being provided at their lower edges with endless gathering-chains having vertically-projecting fingers, the under portions of said gathering-chains being arranged to be driven rearwardly in proximity to the ground and parallel thereto, and two conveyers 41 and 42, located vertically and opposite each other and adapted to receive the corn as it is discharged from the gathering-chains and convey the same to the stripper, substantially as described.

8. In a corn-harvesting machine, a corn-gathering mechanism consisting of front and rear sprockets located in a vertical plane and in proximity to the ground, an endless toothed gathering-chain carried by said sprockets, and an auxiliary toothed gathering-cylinder located in a substantially horizontal position in rear of said chain and in proximity to the ground, the shaft of said cylinder being connected to and rotating with the shaft of the rear sprocket, substantially as described and for the purpose set forth.

9. In a corn-harvesting machine, a corn-gathering mechanism, consisting of front and rear sprockets, located in proximity to the ground, an endless toothed gathering-chain carried by said sprockets, an auxiliary toothed gathering-cylinder located in rear of said chain, the shaft of said cylinder being connected to and rotating with the shaft of the rear sprocket, a shaft carrying sprockets located above said cylinder, an endless carrier passing over said sprockets and cylinder, and means for driving said upper shaft, substantially as described.

10. In a corn-harvesting machine, an endless carrier for elevating the stalks, consisting of the combination of upper and lower sprockets, endless carrier-chains passing over said sprockets, and cross-bars attached to said chains, said cross-bars having inwardly-turned forward ends, substantially as described.

11. In a corn-harvesting machine, a corn-gathering mechanism, consisting of the combination of a gathering-cylinder provided with teeth arranged at intervals over its entire surface, said cylinder being arranged in a substantially horizontal position and longitudinally of the machine, the forward end of said cylinder being tapered, and an endless carrier passing over said gathering-cylinder, said teeth projecting through said carrier and adapted to gather the corn and transfer the same to the carrier, substantially as described.

12. In a corn-harvesting machine, a corn-gathering mechanism consisting of the combination of a gathering-cylinder provided with teeth arranged at intervals over its entire surface, said cylinder being arranged in a substantially horizontal position and longitudinally of the machine and having its forward end tapered, sprockets carried by said cylinder, a shaft located above said cylinder carrying sprockets in alinement with the sprockets on the cylinder, chains passing over said sprockets, and slats connected transversely to said chains, said slats having inwardly-turned forward ends corresponding to the taper of the cylinder, substantially as described.

13. In a corn-harvesting machine having a main frame provided with an internal channel, stripper-rollers arranged on opposite sides thereof, the combination of gathering-cylinders provided with teeth arranged at intervals over their entire surfaces, said cylinders being arranged substantially horizontally and longitudinally of the machine, sprockets arranged above said cylinders, and endless carriers passing over said sprockets and cylinders, said carriers and cylinders being arranged and driven on opposite sides of said channel, and adapted to lift the corn and conduct the same to the stripper-rollers, substantially as described.

14. In a corn-harvesting machine provided with an internal channel, having stripper-rollers located therein, endless vertical carriers arranged and driven on opposite sides of said channel, one of said carriers being shorter than the other, and a hopper located adjacent to the shorter carrier, substantially for the purpose set forth.

15. In a corn harvesting machine, consisting of two outer frames and an inner frame, channels between said frames, stripper-rollers located on opposite sides of said channels, inner and outer vertical endless carriers arranged and driven on each side of said channels, and hoppers located between the inner carriers and adjacent thereto, said inner carriers being shorter than said outer carriers, substantially as described.

16. In a corn-harvesting machine, a main frame provided with internal channels having stripper-rollers located therein, front and rear sprockets located in proximity to the ground on each side of said channels, endless gathering-chains carried by said sprockets, upper and lower sprockets located on opposite sides of said channels, said lower sprockets being located in proximity to the ground in the rear of and adjacent to said rear sprockets, endless carriers carried by said upper and lower sprockets, the shafts of each lower sprocket being connected to the shafts of its corresponding rear sprocket by a universal joint, and means for driving said upper sprockets whereby the corn and stalks will be drawn into said channels and lifted up and conducted to the stripper, substantially as described.

17. In a corn-harvesting machine, a stripping mechanism consisting of the combination of stripper-rollers, and means for deflecting the ear to break it from the stalk as the stalk is drawn into the stripper-rollers, consisting of an auxiliary roller mounted in front of the opening between said stripper-rollers and adapted to be freely rotated by the corn as it passes to the stripper, substantially as described.

18. In a corn-harvesting machine, a stripping mechanism consisting of the combination of stripper-rollers, and means for deflecting the ear to break it from the stalk as the stalk is drawn into the stripper-rollers, consisting of a smooth auxiliary roller mounted in front of the opening between said stripper-rollers and adapted to be freely rotated by the corn as it passes to the stripper, substantially as described.

19. In a corn-harvesting machine, a stripping mechanism consisting of the combination of stripper-rollers, and means for deflecting the ear to break it from the stalk as the stalk is drawn into the stripper-rollers, consisting of a smooth auxiliary roller mounted in front of the opening between said stripper-rollers, and parallel to said rollers, and adapted to be freely rotated by the corn as it passes to the stripper, substantially as described.

20. In a corn-harvesting machine, a stripping mechanism consisting of the combination of stripper-rollers, and means for deflecting the ear to break it from the stalk as the stalk is drawn into the stripper-rollers, consisting of an auxiliary roller mounted in front of the opening between said stripper-rollers, and parallel to said rollers, and adapted to be freely rotated by the corn as it passes to the stripper, and means for adjusting said auxiliary roller with relation to said opening, substantially as described.

21. In a corn-husking mechanism, the combination of husking-rollers, and independent means for rotating the ears longitudinally upon and pressing them against said husking-rollers, said means consisting of an endless belt driven transversely over and upon said ears, and an independent endless conveyer for carrying the ears along said husking-rollers, said conveyer passing between the husking-rollers and the endless belt, substantially as described.

22. In a corn-husking mechanism, the combination of husking-rollers, and independent means for rotating the ears longitudinally upon and pressing them against said husking-rollers, said means consisting of an endless belt driven over and upon said ears, and an independent endless conveyer for carrying the ears along said husking-rollers, said conveyer passing between the husking-rollers and the endless belt, substantially as described.

23. In a corn-harvesting machine, a hopper for receiving the ears from the stripper-rollers, a conveyer-belt operating in the bottom of said hopper for conveying the ears to the husking mechanism of the machine, said conveyer being provided with transverse rods, and an agitator in the lower end of said hopper, consisting of a pivoted plate, the lower edge of said plate depending in the path of the cross-bars of the conveyer, whereby said plate will be oscillated as the bars of the conveyer strike the same, substantially as described.

24. A corn-husking mechanism, consisting of the combination of one or more pairs of husking-rollers, the rolls of each pair being driven toward each other, a pressure-belt above said rollers driven at right angles to said rollers and in proximity thereto, stop-bars arranged parallel to said rollers and between said belt and said rollers, one of said bars being arranged over each roll which rotates in the same direction as said belt, and an endless conveyer driven longitudinally of said rolls for carrying the ears along the same, substantially as described.

25. A corn-husking mechanism, consisting of the combination of one or more pairs of husking-rollers, the rolls of each pair being driven toward each other, a pressure-belt above said rollers driven at right angles to said rollers and in proximity thereto, stop-bars arranged parallel to said rollers and between said belt and said rollers, one of said bars being arranged over each roll which rotates in the same direction as said belt, and an endless conveyer driven longitudinally of said rolls for carrying the ears along the same, said conveyer being driven between said rolls and stop-bars, substantially as described.

26. In a corn-husking mechanism, the combination of husking-rollers, and independent means for rotating the ears longitudinally upon and pressing them against said husking-rollers, consisting of an endless belt driven transversely over and upon said ears, an independent endless conveyer driven longitudinally of said rolls for carrying the ears along the same, and means for confining the ears to the set of rolls upon which they are first conveyed, substantially as described.

27. In a corn-harvesting machine, a husking mechanism, consisting of a hopper adapted to receive the ears of corn as they are stripped from the stalk, a pair of husking-rollers adjacent to said hopper, a conveyer for carrying the ears from the hopper to the husking-rolls, and an adjustable guard arranged between the hopper and the husking-rolls to prevent the passage of more than one ear at a time from the hopper to the rolls, substantially as described.

28. In a corn-harvesting machine, the combination of a hopper, a pair of husking-rollers for said hopper, said rollers and hopper being arranged in line, an opening in the side of said hopper, one end of the rolls being adjacent said opening, an endless conveyer arranged in the bottom of said hopper and carried longitudinally over said rolls, and means for adjusting said opening so that no more than a single ear will be discharged therethrough at a time, substantially as described.

29. In a corn-harvesting machine, a discharging-elevator consisting of a box provided with a pair of endless conveyers, a horizontal rotatable base, standards extending upwardly from said base upon which said box is pivotally supported at one end, a vertical shaft extending through the center of said base and provided at its upper end above said base with a bevel-gear, a horizontal shaft rotatably journaled in said arms, its axis being coincident with the axis upon which said box is pivoted, a bevel-gear on said horizontal shaft in mesh with the bevel-gear of said vertical shaft, a pair of sprockets carried by said horizontal shaft on opposite sides of said bevel-gears, over which said conveyers pass, and means for driving said vertical shaft, substantially as described.

30. In a corn-harvesting machine, a main frame consisting of the combination of two outer side frames, an upwardly-projecting yoke connecting said outer frames, an inner frame supported by said yoke, whereby internal channels are formed in said main frame, stripper-rolls located on each side of said channels, upper and lower sprockets located on opposite sides of said channels in advance of said strippers, endless carriers carried by said sprockets, a main driving-shaft extending transversely and located in the rear of said machine, rods 40 driven by said main shaft and connected at their forward ends to the upper sprockets of the outer carriers, shafts 27 journaled in the upper portion of said yoke and geared at their forward ends to said stripper-roll, rods 28 driven by said main shaft and connected to said shafts 27, sprockets carried by said shafts 27 and by the upper sprocket-shafts of said inner carriers, and driving-chains carried by said sprockets, substantially as described.

Signed at Washington, in the District of Columbia, this 15th day of February, A. D. 1897.

CHARLES EDWIN KNUDSON.

Witnesses:
   JOHN W. GARDNER,
   EDW. S. DUVALL, Jr.